5897X
S. KING.
HORSESHOE.
Patented Apr. 1, 1830.
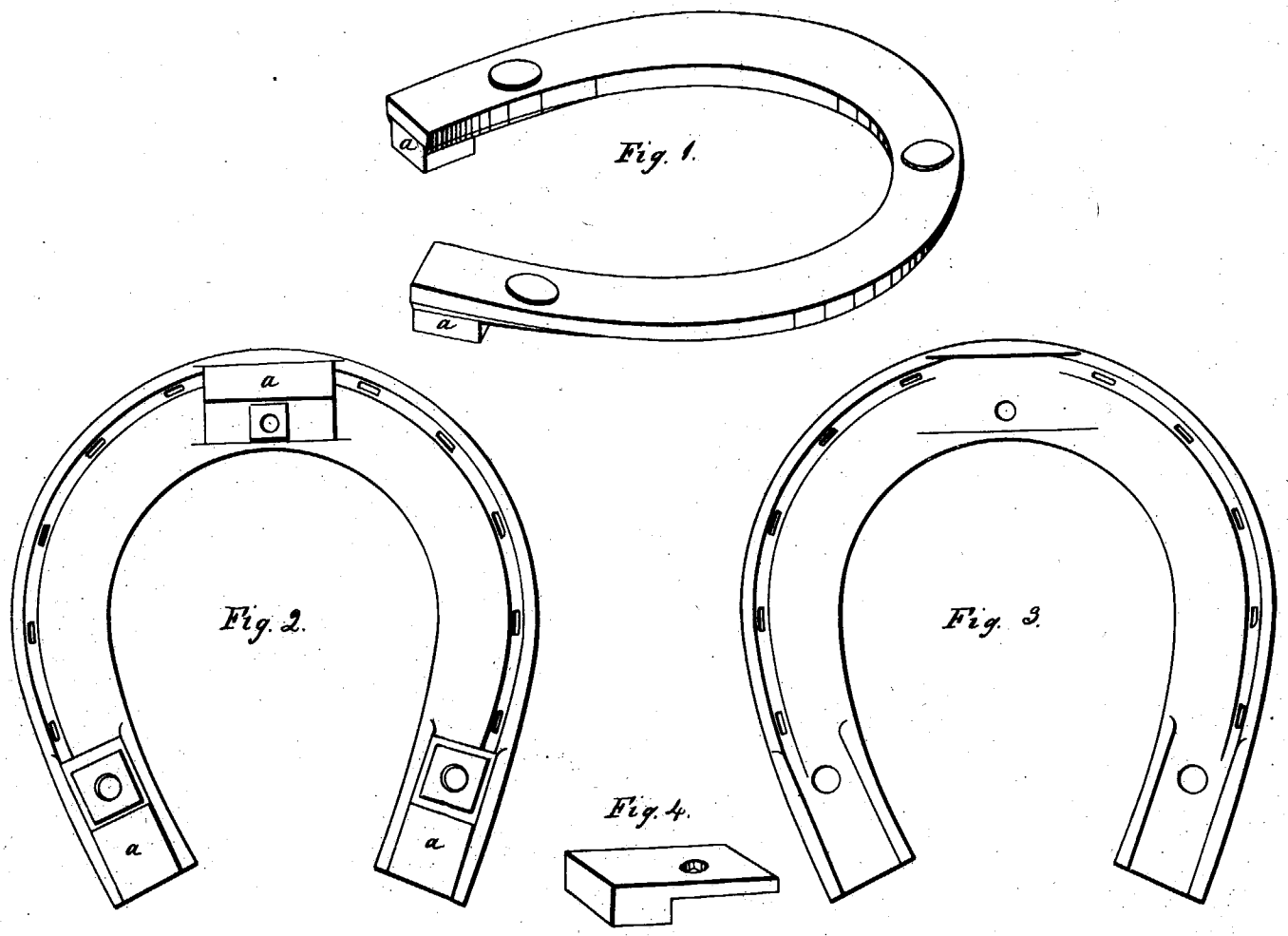

Sumner King of Sullivan, Madison County New York.
Letters Patent.

The Schedule refered to in these Letters Patent and making part of the same. containing a description in the words of the said Sumner King himself of his improvement in Horse Shoes.

Be it known that I Sumner King of Sullivan Madison County & State of New York. have made an improvement in Horse Shoes & that the following is a description of the same.

The Horse Shoe is made in the usual form either of wrought or cast iron. instead of the caulks or projections being permanent; they are made movable. so that when one set are worn out, they can be removed and another set supplied. For this purpose a projection on the front on the lower side of the shoe is cast or raised by swaging. having a suitable opening or mortise to admit the movable caulk to slide in with a hole or opening through the shoe and caulk, to admit a bolt screw to pass thro and fasten the caulk to the shoe by a nut. The hinder caulks can be made movable also. and fastened on in the same way, or they may be permanent. These caulks can be cast or made of steel or iron or any other metal.

What I claim as my invention is the making of moveable caulks or projections for Horse Shoes. whether made of cast or wrought iron, or of any other metal as above described. For a further illustration of my invention I refer to the model & drawing of the same deposited in the Patent Office.

In testimony whereof I have hereunto subscribed my name at the City of Washington this 23rd of January 1830.

Witnesses
Wm P. Elliot
Chs M. Keller

Sumner King.

[illegible]

(325 words)

(Patented April 1. 1830)